US007996991B2

(12) United States Patent
Oguri

(10) Patent No.: US 7,996,991 B2
(45) Date of Patent: Aug. 16, 2011

(54) METHOD FOR MANUFACTURING LIQUID JET HEAD

(75) Inventor: Minoru Oguri, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 211 days.

(21) Appl. No.: 12/405,991

(22) Filed: Mar. 17, 2009

(65) Prior Publication Data

US 2009/0229126 A1 Sep. 17, 2009

(30) Foreign Application Priority Data

Mar. 17, 2008 (JP) ................................ 2008-067212
Feb. 2, 2009 (JP) ................................ 2009-021216

(51) Int. Cl.

| | |
|---|---|
| ***B21D 53/76*** | (2006.01) |
| ***B23P 17/00*** | (2006.01) |
| ***B41J 2/15*** | (2006.01) |
| ***B41J 2/145*** | (2006.01) |
| ***B29C 65/00*** | (2006.01) |
| ***B32B 37/00*** | (2006.01) |

(52) U.S. Cl. .......................... 29/890.1; 347/40; 156/290

(58) Field of Classification Search ................. 29/890.1, 29/25.35; 347/20, 40, 44-45, 47, 63, 64, 347/65; 310/328, 348; 156/290, 292, 155
See application file for complete search history.

(56) References Cited

U.S. PATENT DOCUMENTS 5,736,998 A * 4/1998 Caren et al. ..................... 347/45
6,257,703 B1 * 7/2001 Hirosawa et al. ............... 347/50
6,609,782 B2 * 8/2003 Mori .............................. 347/50
7,882,607 B2 * 2/2011 Li ............................... 29/25.35
2005/0168524 A1 * 8/2005 Xin-Shan et al. ............... 347/40
2005/0185025 A1 * 8/2005 Shimada et al. ................ 347/68
2005/0262691 A1 * 12/2005 Torimoto et al. ............ 29/890.1
2006/0064873 A1 * 3/2006 Matsuzawa et al. ......... 29/890.1
2007/0074394 A1 * 4/2007 Miyata et al. ................ 29/890.1
2008/0034563 A1 * 2/2008 Xin-Shan et al. ............ 29/25.35
2008/0127471 A1 * 6/2008 Matsuzawa .................. 29/25.35

FOREIGN PATENT DOCUMENTS

JP 2006-088665 * 4/2006
JP 2006-088665 A 4/2006

* cited by examiner

*Primary Examiner* — A. Dexter Tugbang
*Assistant Examiner* — David P Angwin
(74) *Attorney, Agent, or Firm* — Kilpatrick Townsend & Stockton LLP

(57) ABSTRACT

A method for manufacturing a liquid jet head is provided, which includes: a preparation step of preparing a substrate array which is provided with a first substrate having formed therein a first flow path, a second substrate bonded to one side of the first substrate and having formed therein a second flow path, and a separation layer partitioning the first flow path and the second flow path; a sealing step of sealing the first flow path by adhering a sealing film onto a side of the first substrate opposite to the second substrate using an adhesive layer; and a removal step of removing the separation layer after the sealing step is performed, wherein in the removal step, the separation layer is removed in a state in which an internal pressure of the first flow path is lower than an external pressure.

5 Claims, 9 Drawing Sheets

METHOD FOR MANUFACTURING LIQUID JET HEAD

BACKGROUND

1. Technical Field

The present invention relates to a method for manufacturing a liquid jet head.

2. Related Art

A known example of a liquid jet head for ejecting liquid from nozzle openings includes a flow path forming substrate formed with pressure generating chambers at least communicated with nozzle openings, piezoelectric elements formed on one surface side of the flow path forming substrate, and a reservoir forming plate having a part of a reservoir, in which the reservoir is formed via a penetrated portion penetrating a vibration plate and a lamination film provided on the vibration plate. For example, JP-A-2006-088665 discloses a technique in which the reservoir is formed by penetrating the reservoir by wet etching so that processing waste during the penetration is not produced.

In JP-A-2006-088665, the reservoir forming plate having formed therein a part of the reservoir is bonded to the flow path forming substrate in which a wiring layer is formed in a region thereof where the penetrated portion is formed, and a surface of the flow path forming substrate opposite to the wiring layer is wet-etched until the wiring layer is exposed, thereby forming a flow path. Next, a protective layer is formed on at least the pressure generating chambers and the flow path which is to be penetrated. Then, a release layer whose adhesion to the wiring layer is greater than the adhesion between the wiring layer and the protective layer is formed by the CVD process or the like. A surface of the flow path forming substrate opposite to the wiring layer is wet-etched so that the release layer and the protective layer are removed. Moreover, the surface of the flow path forming substrate opposite to the wiring layer is wet-etched so that the wiring layer is removed and the flow path forming substrate is penetrated, thereby forming the reservoir.

At this time, liquid performing the wet etching enters into the reservoir forming plate from the penetrated portion, whereby the connection wiring formed on the surface of the reservoir forming plate opposite to the flow path forming substrate is damaged. To prevent such damage, JP-A-2006-088665 discloses a technique of sealing the connection wiring side of the reservoir portion by a film such as PPS (polyphenylene sulfide) or the like.

However, the etching solution for performing the wet etching may sometimes leak from the opening portion of the reservoir portion which has been sealed, damaging the connection wiring formed in the reservoir forming plate, thus leading to a break in the wiring or the like.

SUMMARY

The invention aims to solve at least part of the above-described problems and can be actualized as a form or an application described below.

Application 1

A method for manufacturing a liquid jet head, including: a preparation step of preparing a substrate array which is provided with a first substrate having formed therein a first flow path, a second substrate bonded to one side of the first substrate and having formed therein a second flow path, and a separation layer partitioning the first flow path and the second flow path; a sealing step of sealing the first flow path by adhering a sealing film onto a side of the first substrate opposite to the second substrate using an adhesive layer; and a removal step of removing the separation layer after the sealing step is performed, wherein in the removal step, the separation layer is removed in a state in which an internal pressure of the first flow path is lower than an external pressure.

According to such a configuration, in the removal step, the separation layer is removed in a state in which the internal pressure of the first flow path is lower than the external pressure. Therefore, since in the removal step, a force is generated in the sealing film causing the sealing film to be drawn into the first flow path, the adhesion of the sealing film sealing the first flow path is improved. For this reason, the etching solution for removing the separation layer in the removal step is prevented from leaking from the first flow path, whereby the connection wiring formed in the first substrate is prevented from being damaged by the etching solution and thus leading to a break in the wiring or the like.

Application 2

The method for manufacturing the liquid jet head according to Application 1, further comprising a heating step of heating the substrate array to a predetermined temperature or higher before the sealing step is performed, wherein in the removal step, the separation layer is removed at the predetermined temperature or lower.

According to such a configuration, the temperature within the first flow path which is hermetically sealed by the sealing film is lowered from the temperature in the sealing step to the temperature in the removal step. Therefore, in the removal step, the internal pressure of the first flow path becomes lower than the external pressure. Accordingly, since in the removal step, a force is generated in the sealing film causing the sealing film to be drawn into the first flow path, the adhesion of the sealing film sealing the first flow path is improved.

Application 3

The method for manufacturing the liquid jet head according to Application 2, further comprising a temperature lowering step of lowering the temperature of the substrate array from the predetermined temperature after the sealing step is performed.

According to such a configuration, the temperature within the first flow path which is hermetically sealed by the sealing film shows a large difference between the temperature in the sealing step and the temperature in the removal step. Therefore, since at a time point before the removal step is performed, the force causing the sealing film to be drawn into the first flow path is further increased, the adhesion of the sealing film sealing the first flow path is further improved.

Application 4

The method for manufacturing the liquid jet head according to Application 3, wherein in the temperature lowering step, the substrate array is left under a room temperature.

According to such a configuration, the temperature within the first flow path which is hermetically sealed by the sealing film shows a large difference between the temperature in the sealing step and the temperature in the removal step. Therefore, since at a time point before the removal step is performed, the force causing the sealing film to be drawn into the first flow path is further increased, the adhesion of the sealing film sealing the first flow path is further improved.

Application 5

The method for manufacturing the liquid jet head according to Application 1, wherein in the sealing step, the first flow path is sealed under a first pressure environment, and wherein in the removal step, the separation layer is removed under a second pressure environment higher than the first pressure environment.

According to such a configuration, the removal step can be performed in a state in which the internal pressure of the first flow path which is hermetically sealed by the sealing film is lower than the external pressure. Accordingly, since in the removal step, a force is generated in the sealing film causing the sealing film to be drawn into the first flow path, the adhesion of the sealing film sealing the first flow path is improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments will be described herein below with reference to the accompanying drawings.

Embodiment 1

Figure 1:
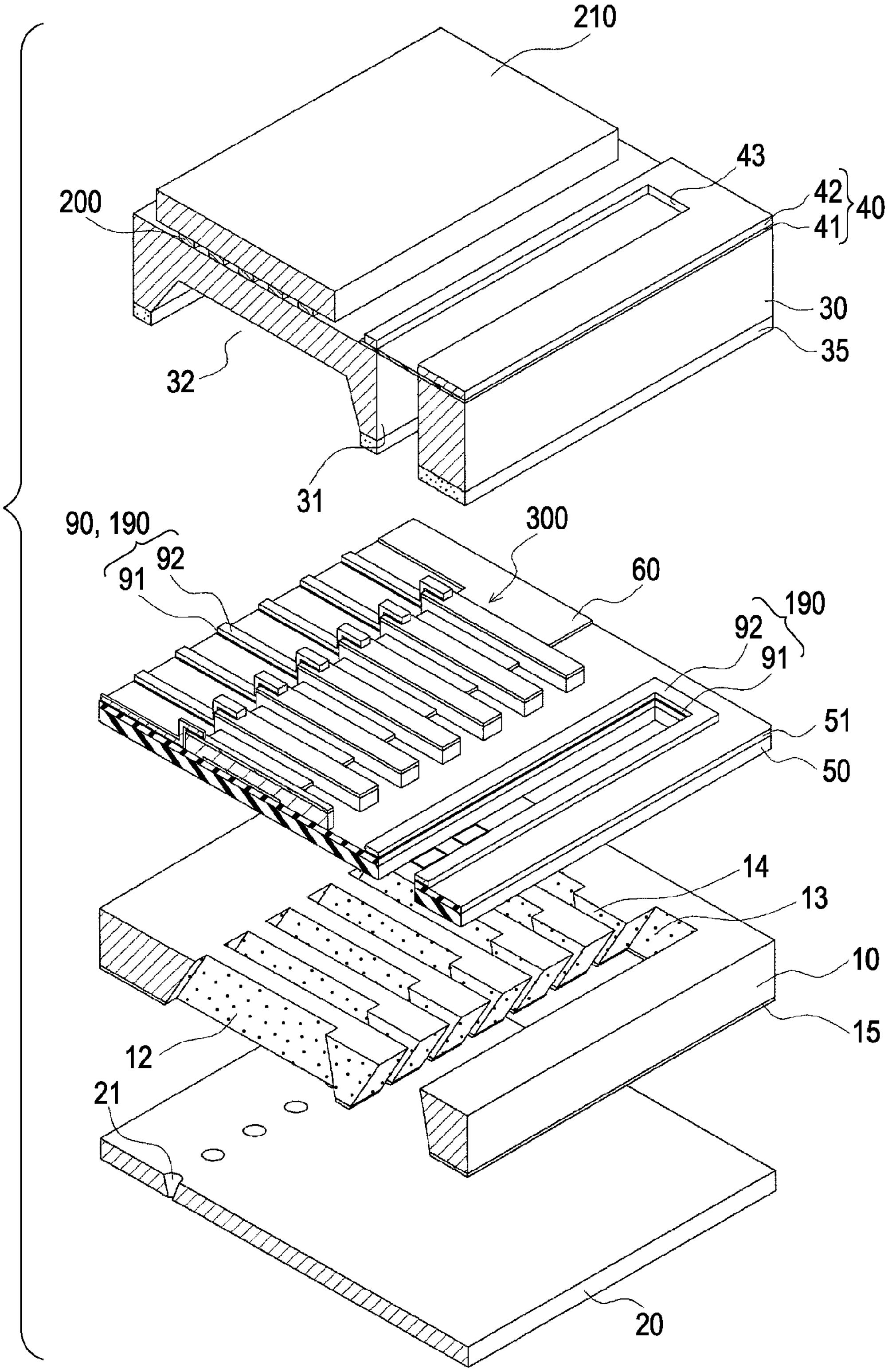
FIG. 1 is an exploded perspective view of a recording head according to Embodiments of the invention.
Figure 2A:
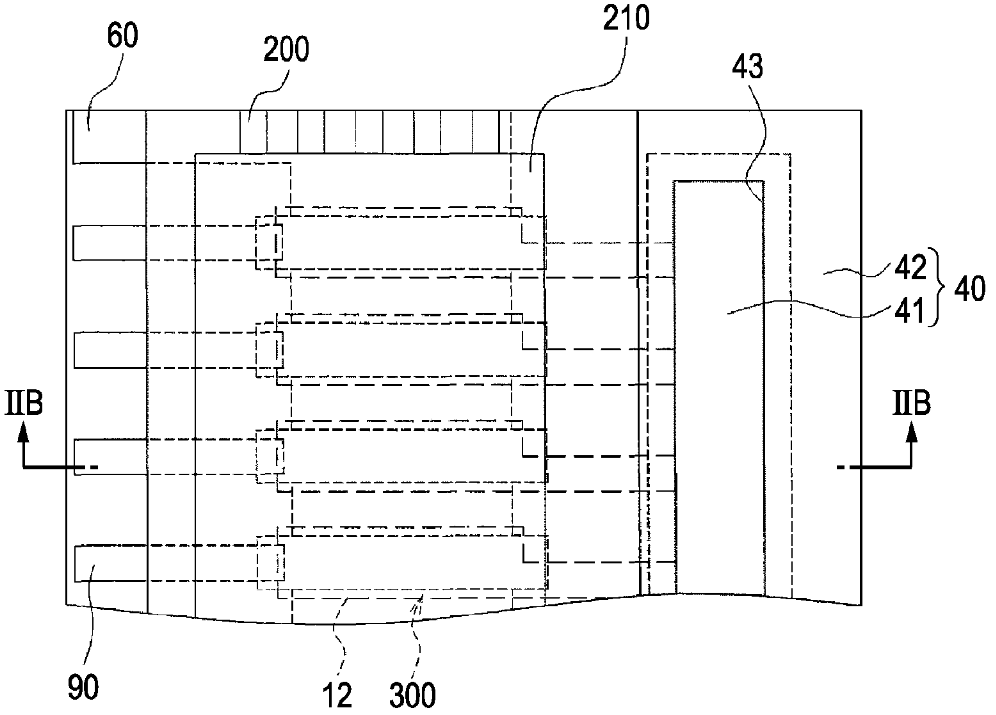
FIGS. 2A and 2B are, respectively, a plan view and a sectional view of the recording head according to Embodiments of the invention.
Figure 2B:
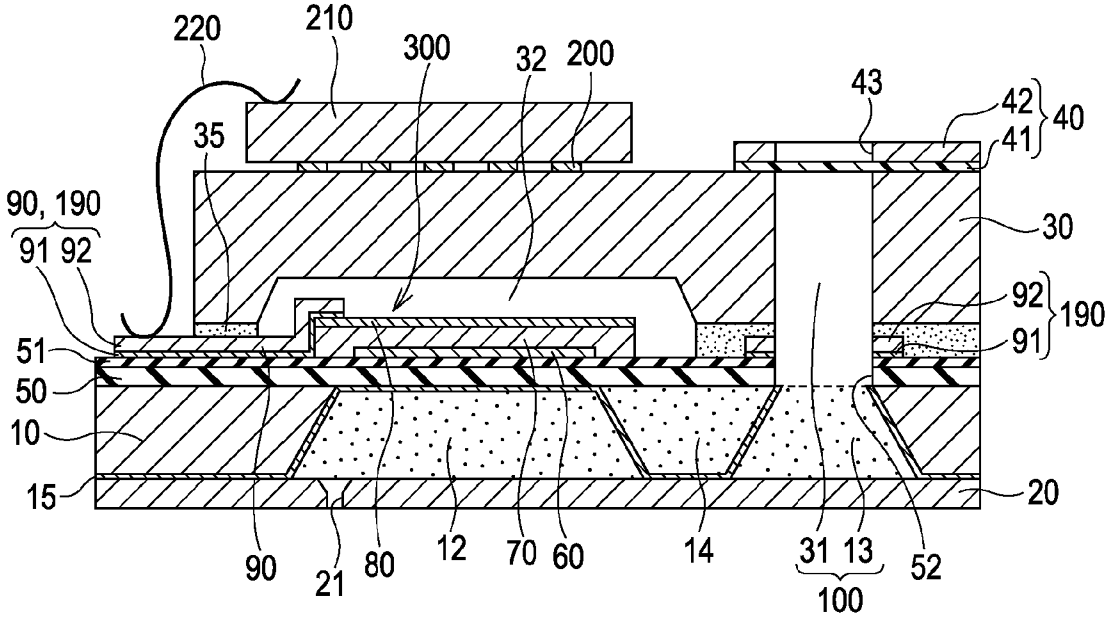

FIG. 1 is an exploded perspective view showing an ink jet recording head which is produced by the manufacturing method according to Embodiment 1 of the invention. FIGS. 2A and 2B are a plan view and a sectional view, respectively, of the ink jet recording head shown in FIG. 1. As shown in FIGS. 1, 2A, and 2B, a flow path forming substrate 10 is formed of a single crystal silicon substrate which has a plane (110) of the plane orientation in the present embodiment. An elastic film 50 which is preliminarily formed of silicon dioxide by thermal oxidation and has a thickness of 0.5 to 2 μm is formed on one surface of the flow path forming substrate 10.

In the flow path forming substrate 10, a plurality of pressure generating chambers 12 are arranged in the width direction of the flow path forming substrate 10. A communicating portion 13 is formed in a region of the flow path forming substrate 10 being disposed at an outside in a longitudinal direction of the pressure generating chambers 12. The communicating portion 13 and each of the pressure generating chambers 12 are communicated with each other via an ink supply path 14 which is provided for each of the pressure generating chambers 12. The communicating portion 13 is communicated with a reservoir portion 31, which serves as a flow path of a later-described reservoir forming plate 30, thereby constituting a reservoir 100 which serves as a common ink chamber for the respective pressure generating chambers 12. It goes without saying that only the reservoir portion 31 of the reservoir forming plate 30 may be used as the reservoir. The ink supply path 14 is formed with a width narrower than that of the pressure generating chamber 12, and is configured to keep constant flow path resistance of ink flowing from the communicating portion 13 into the pressure generating chambers 12.

On the inner wall surface of each of the pressure generating chambers 12, the communicating portion 13, and the ink supply paths 14 of the flow path forming substrate 10, a protective film 15 formed of a material having liquid resistance (ink resistance), for example, tantalum oxide, such as tantalum pentoxide ($Ta_2O_5$), is provided with a thickness of about 50 nm. The liquid resistance (ink resistance) as used herein refers to resistance to dissolving of the flow path forming substrate 10 with liquid such as ink. In the present embodiment, the protective film 15 is also provided on a surface of the flow path forming substrate 10 where the pressure generating chambers 12 are open, namely, on a bonding surface of the flow path forming substrate 10 to which a nozzle plate 20 is bonded. It goes without saying that the protective film 15 does not need to be provided in such a region, because ink might not be substantially brought into contact with such a region.

The material for the protective film 15 is not limited to tantalum oxide and, depending on the pH value of the liquid (e.g., ink) used, zirconium oxide ($ZrO_2$), nickel (Ni) and chromium (Cr), for example, may be used as the material.

Onto the surface of the flow path forming substrate 10 where the protective film 15 has been formed, the nozzle plate 20 having nozzle openings 21 bored therein is fixedly secured by an adhesive or a heat welding film. The nozzle openings 21 are communicated with a zone near the end of the pressure generating chambers 12 on the side opposite to the liquid supply paths 14. The nozzle plate 20 is formed of a glass ceramic, a single crystal silicon substrate, or stainless steel or the like having a thickness of, for example, 0.01 to 1 mm, and a linear expansion coefficient of, for example, 2.5 to 4.5 [$\times 10^{-6}$/° C.] at 300° C. or below.

On the surface of the flow path forming substrate 10 opposite to the nozzle plate 20, the elastic film 50 having a thickness, for example, of about 1.0 μm is formed, as described above. An insulation film 51 having a thickness, for example, of about 0.4 μm is formed on the elastic film 50. On the insulation film 51, a lower electrode film 60 with a thickness, for example, of about 0.2 μm, a piezoelectric layer 70 with a thickness, for example, of about 1.0 μm, and an upper electrode film 80 with a thickness, for example, of about 0.05 μm are formed in a laminated state by a later-described process, thereby constituting a piezoelectric element 300. The piezoelectric element 300 refers to a portion including the lower electrode film 60, the piezoelectric layer 70, and the upper electrode film 80. Generally, one of the electrodes of the piezoelectric element 300 is used as a common electrode, and the other electrode and the piezoelectric layer 70 are patterned to be constructed for each of the pressure generating chambers 12. A portion, which is composed of any one of the electrodes and the piezoelectric layer 70 that have been patterned, and which undergoes piezoelectric distortion upon application of voltage to both electrodes, is called a piezoelectric active portion. In the present embodiment, the lower electrode film 60 is used as the common electrode for the piezoelectric elements 300, while the upper electrode film 80 is used as an individual electrode of each of the piezoelectric elements 300. However, there is no harm in reversing their usages for the convenience of the drive circuit or wiring. In either case, the piezoelectric active portion is formed for each of the pressure generating chambers 12. Herein, the piezoelectric elements 300 and a vibration plate, where displacement occurs by a drive of the piezoelectric elements 300, are referred to collectively as a piezoelectric actuator.

A lead electrode 90, which is a wiring layer 190 consisting of an adhesion layer 91 and a metal layer 92, is connected to the upper electrode film 80 of each of the piezoelectric elements 300. Voltage is selectively applied to each of the piezoelectric elements 300 via the lead electrode 90. The wiring layer 190, which consists of the same layers as those of the lead electrode 90, i.e., the adhesion layer 91 and the metal layer 92, is also present on the insulation film 51 in a region corresponding to an opening peripheral edge zone of the communicating portion 13.

The reservoir forming plate 30, which has the reservoir portion 31 constituting at least a part of the reservoir 100, is bonded onto a surface of the flow path forming substrate 10 where the piezoelectric elements 300 have been formed. In the present embodiment, the flow path forming substrate 10 and the reservoir forming plate 30 are bonded together by use of an adhesive 35. The reservoir portion 31 of the reservoir forming plate 30 is brought into communication with the communicating portion 13 via a through-hole 52 provided in the elastic film 50 and the insulation film 51, whereby the reservoir 100 is formed by the reservoir portion 31 and the communicating portion 13.

In a region of the reservoir forming plate 30 opposed to the piezoelectric elements 300, there is provided a piezoelectric element holding portion 32. Since the piezoelectric elements 300 are formed within the piezoelectric element holding portion 32, they are protected in a state in which they are substantially free from the influence of an external environment. The piezoelectric element holding portion 32 may be, or may not be, sealed. The material for the reservoir forming plate 30 having such a configuration is, for example, glass, a ceramic material, a metal, or a resin or the like. Preferably, the reservoir forming plate 30 is formed of a material having approximately the same thermal expansion coefficient as that of the flow path forming substrate 10. In the present embodiment, the reservoir forming plate 30 is formed using a single crystal silicon substrate which is formed of the same material as that of the flow path forming substrate 10.

A connection wiring 200 formed in a predetermined pattern is provided on a surface of the reservoir forming plate 30 opposite to the bonding surface of the flow path forming substrate 10, and a drive IC 210 for driving the piezoelectric elements 300 is mounted on the connection wiring 200. A front end portion of each lead electrode 90 led from each piezoelectric element 300 to an outside of the piezoelectric element holding portion 32 is electrically connected to the drive IC 210 via a drive wiring 220.

Furthermore, a compliance plate 40, which consists of a sealing film 41 and a fixing plate 42, is bonded onto a region of the reservoir forming plate 30 corresponding to the reservoir portion 31. The sealing film 41 is formed of a material having a low rigidity and flexibility (for example, a polyphenylene sulfide (PPS) film having a thickness of 6 μm), and the sealing film 41 seals one surface of the reservoir portion 31. The fixing plate 42 is formed of a hard material such as a metal (for example, stainless steel (SUS) having a thickness of 30 μm). A region of the fixing plate 42 opposed to the reservoir 100 defines an opening portion 43 which is completely deprived of the plate in the thickness direction. Thus, one surface of the reservoir 100 is sealed only with the sealing film 41 having flexibility.

In the ink jet recording head of the present embodiment, ink is taken in from a non-illustrated external ink supply unit, and the interior of the head ranging from the reservoir 100 to the nozzle openings 21 is filled with the ink. Then, according to recording signals from the drive IC 210, voltage is applied between the lower electrode film 60 and the upper electrode film 80 corresponding to each of the pressure generating chambers 12 to warp and deform the piezoelectric element 300 and the vibration plate. As a result, the pressure in each of the pressure generating chambers 12 rises, and thus ink is ejected through the nozzle openings 21.

The method for manufacturing the above-mentioned ink jet recording head will be described with reference to FIGS. 3A to 3C to FIGS. 8A and 8B. FIGS. 3A to 3C to FIGS. 8A and 8B are sectional views of the pressure generating chamber taken along the longitudinal direction, showing the method for manufacturing the ink jet recording head.

First, a preparation step of the present embodiment will be described.

Figure 3A:
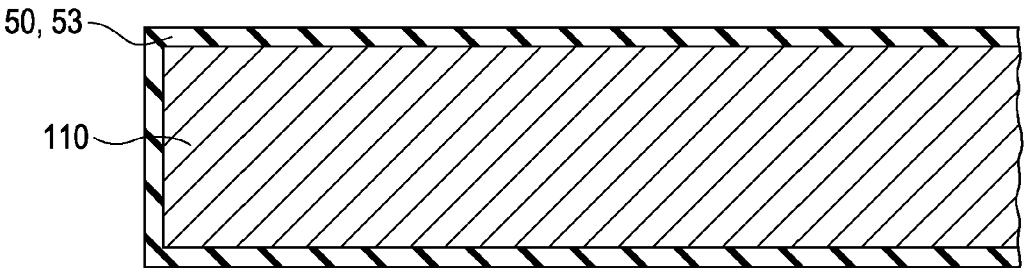
FIGS. 3A to 3C are sectional views showing steps in a manufacturing process for the recording head according to Embodiments of the invention.

First, as shown in FIG. 3A, a silicon dioxide film 53 constituting the elastic film 50 is formed on a surface of a flow path forming substrate wafer 110. In the present embodiment, a silicon wafer having a relatively large thickness of about 625 μm and having high rigidity is used as the flow path forming substrate wafer 110.

Figure 3B:
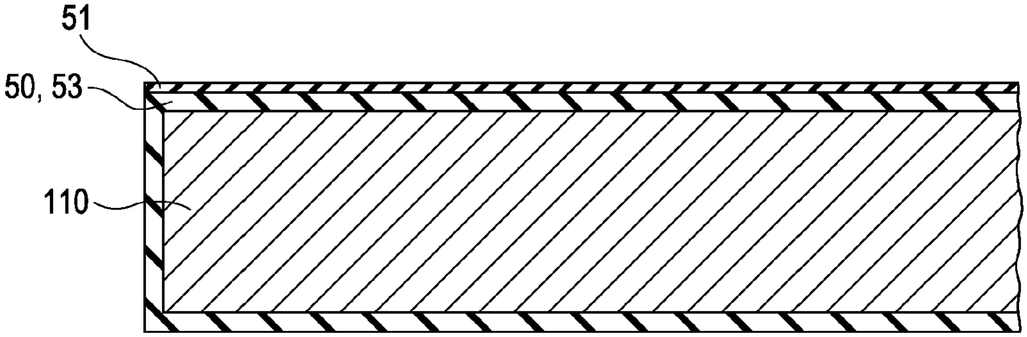

Next, as shown in FIG. 3B, the insulation film 51 formed of zirconium oxide is formed on the elastic film 50 (silicon dioxide film 53). Specifically, a zirconium (Zr) layer is formed on the elastic film 50 (silicon dioxide film 53), for example, by sputtering or the like. Thereafter, the zirconium layer is thermally oxidized, for example, in a diffusion furnace at a temperature of 500 to 1,200° C. to form the insulation film 51 comprising zirconium oxide ($ZrO_2$).

Figure 3C:
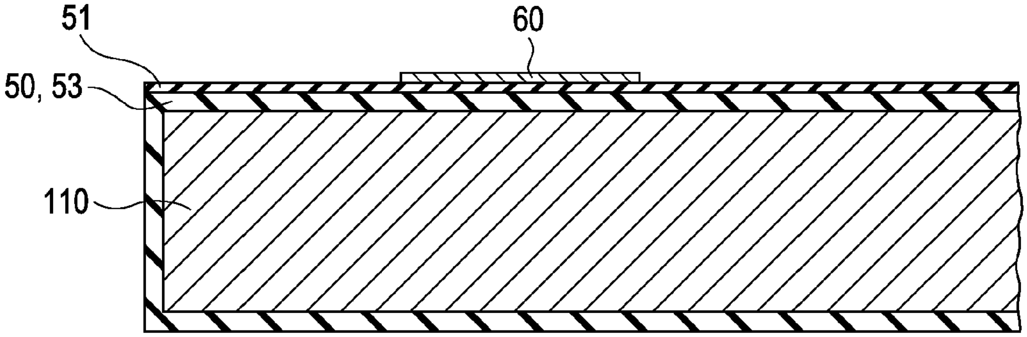
Figure 4A:
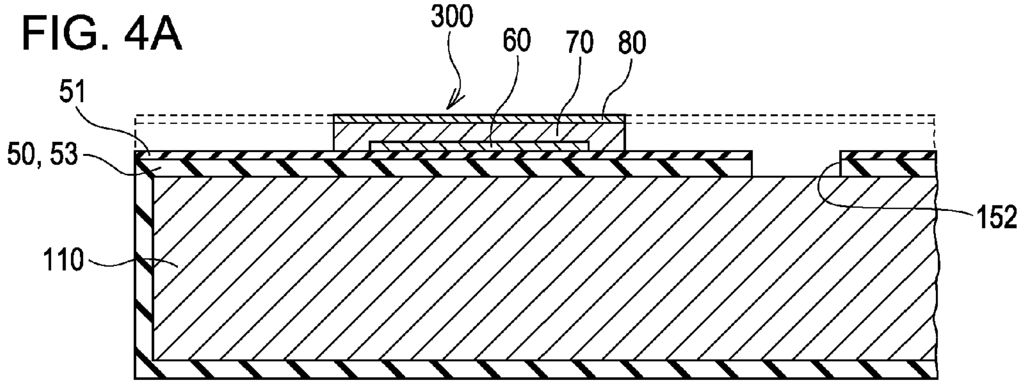
FIGS. 4A to 4C are sectional views showing the steps in the manufacturing process for the recording head according to Embodiments of the invention.

Then, as shown in FIG. 3C, platinum and iridium, for example, are stacked on the insulation film 51 to form the lower electrode film 60. Thereafter, the lower electrode film 60 is patterned into a predetermined shape. Then, as shown in FIG. 4A, the piezoelectric layer 70 comprising, for example, lead zirconate titanate (PZT), and the upper electrode film 80 comprising, for example, iridium, are formed on the entire surface of the flow path forming substrate wafer 110, whereafter the piezoelectric layer 70 and the upper electrode film 80 are patterned in a region opposed to the respective pressure generating chambers 12 to form the piezoelectric elements 300. After the piezoelectric elements 300 are formed, the insulation film 51 and the elastic film 50 are patterned to form an exposed portion 152 in a region of the flow path forming substrate wafer 110 where the communicating portion (not shown) is to be formed. The exposed portion 152 penetrates the insulation film 51 and the elastic film 50, and exposing the surface of the flow path forming substrate wafer 110.

The material for the piezoelectric layer 70 constituting the piezoelectric element 300 is, for example, a ferroelectric piezoelectric material such as lead zirconate titanate (PZT), or a relaxar ferroelectric material having a metal, such as niobium (Nb), nickel (Ni), magnesium (Mg), bismuth or yttrium, added to such a ferroelectric piezoelectric material. The composition of the piezoelectric layer 70 may be chosen, as appropriate, in consideration of the characteristics, uses, and the like of the piezoelectric elements 300. Its examples include $PbTiO_3$ (PT), $PbZrO_3$ (PZ), $Pb(Zr_xTi_{1-x})O_3$ (PZT), $Pb(Mg_{1/3}Nb_{2/3})O_3$—$PbTiO_3$ (PMN-PT), $Pb(Zn_{1/3}Nb_{2/3})O_3$—$PbTiO_3$ (PZN-PT), $Pb(Ni_{1/3}Nb_{2/3})O_3$—$PbTiO_3$ (PNN-PT), $Pb(In_{1/2}Nb_{1/2})O_3$—$PbTiO_3$ (PIN-PT) $Pb(Sc_{1/2}Ta_{1/2})O_3$—$PbTiO_3$ (PST-PT), $Pb(Scl_{1/2}Nb_{1/2})O_3$—$PbTiO_3$ (PSN-PT), $BiScO_3$—$PbTiO_3$ (BS-PT), $BiYbO_3$—$PbTiO_3$ (BY-PT), and the like. It goes without saying that other ferroelectric materials not including lead may be used as the material for the piezoelectric layer 70.

The method for forming the piezoelectric layer 70 is not limited. In the present embodiment, for example, the piezoelectric layer 70 is formed by the so-called sol-gel process which comprises dissolving or dispersing metal organic materials in a catalyst to form a so-called sol, coating and drying the sol to form a gel, and firing the gel at a high temperature to obtain the piezoelectric layer 70 comprising the metal oxide.

Figure 4B:
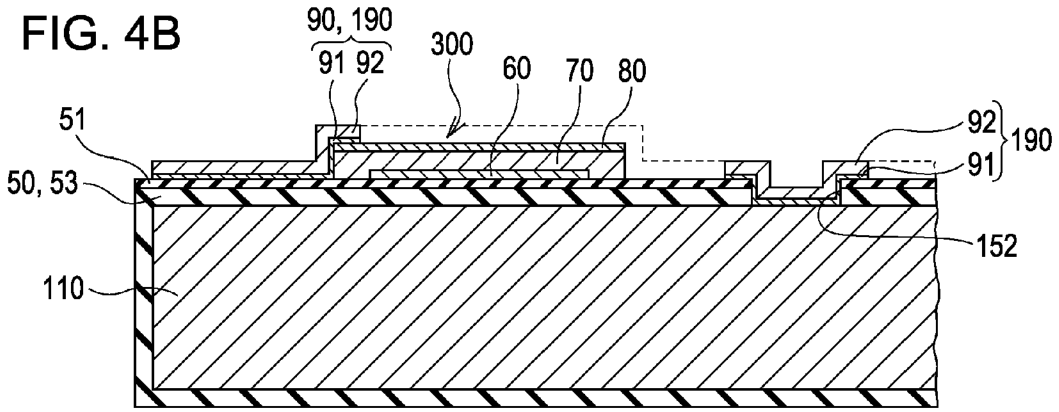

Then, as shown in FIG. 4B, the lead electrode 90 is formed. Specifically, the metal layer 92 is formed via the adhesion layer 91 for ensuring adhesion, whereby the wiring layer 190 consisting of the adhesion layer 91 and the metal layer 92 is formed on the entire surface of the flow path forming substrate wafer 110. At this time, the wiring layer 190 is also formed on the flow path forming substrate wafer 110 in the exposed portion 152, so that the exposed portion 152 is sealed with the wiring layer 190. A mask pattern (not shown) formed, for example, of a resist is formed on the wiring layer 190. The metal layer 92 and the adhesion layer 91 are patterned via this mask pattern for each of the piezoelectric elements 300 to form the lead electrode 90. The wiring layer 190 provided within the exposed portion 152 on the flow path forming substrate wafer 110 is left in such a form that the wiring layer 190 is discontinuous with the lead electrode 90.

The main material for the metal layer 92 constituting the lead electrode 90 is not particularly limited, if it is a material having relatively high electrical conductivity. Its examples include gold (Au), aluminum (Al), copper (Cu) and the like, and gold (Au) is used in the present embodiment. The material for the adhesion layer 91 may be a material which can ensure adhesion of the metal layer 92. Specifically, its examples include titanium (Ti), titanium-tungsten compounds (TiW), nickel (Ni), chromium (Cr), nickel-chromium compounds (NiCr), and the like. In the present embodiment, titanium-tungsten compounds (TiW) are used.

Figure 4C:
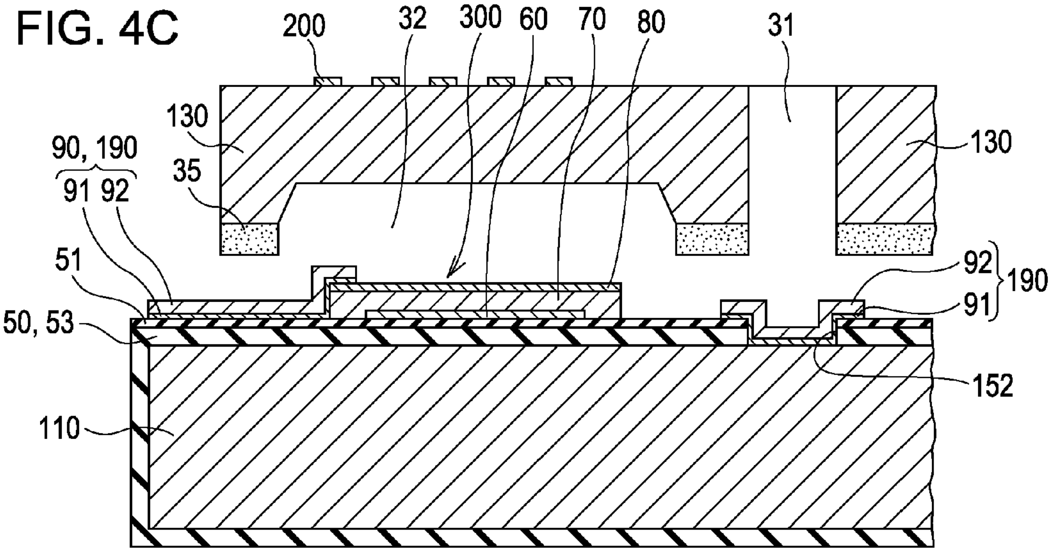

Then, as shown in FIG. 4C, a reservoir forming plate wafer 130 is adhered onto the flow path forming substrate wafer 110 by the adhesive 35. The reservoir forming plate wafer 130 has preliminarily formed therein the reservoir portion 31 and the piezoelectric element holding portion 32, and the afore-mentioned connection wiring 200 has been formed in advance on the reservoir forming plate wafer 130. Since the reservoir forming plate wafer 130 is bonded to the flow path forming substrate wafer 110, the rigidity of the flow path forming substrate wafer 110 can be markedly increased.

Figure 5A:
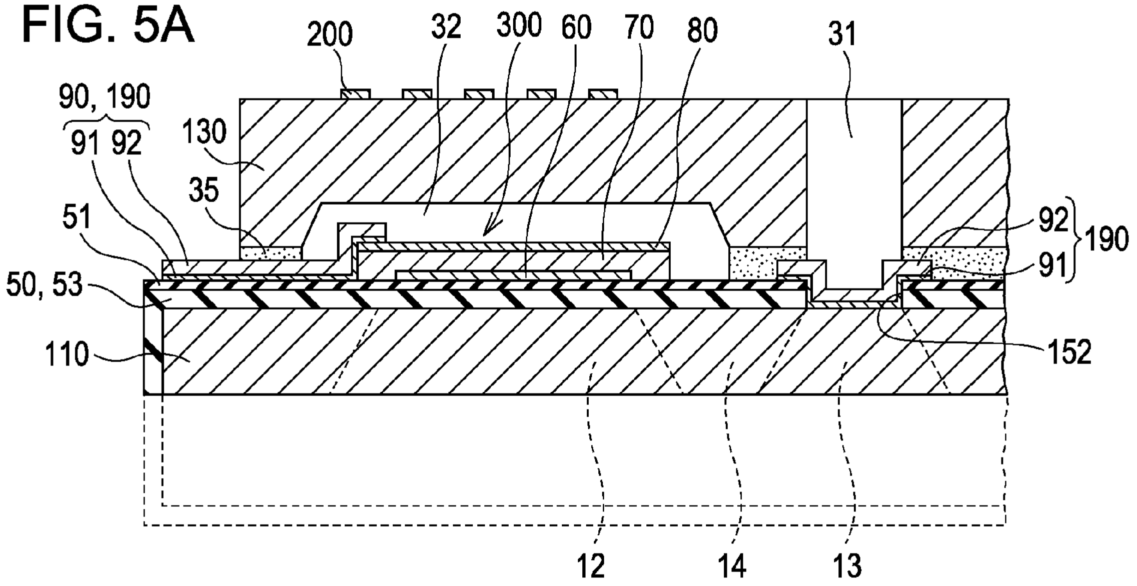
FIGS. 5A to 5C are sectional views showing the steps in the manufacturing process for the recording head according to Embodiments of the invention.
Figure 5B:
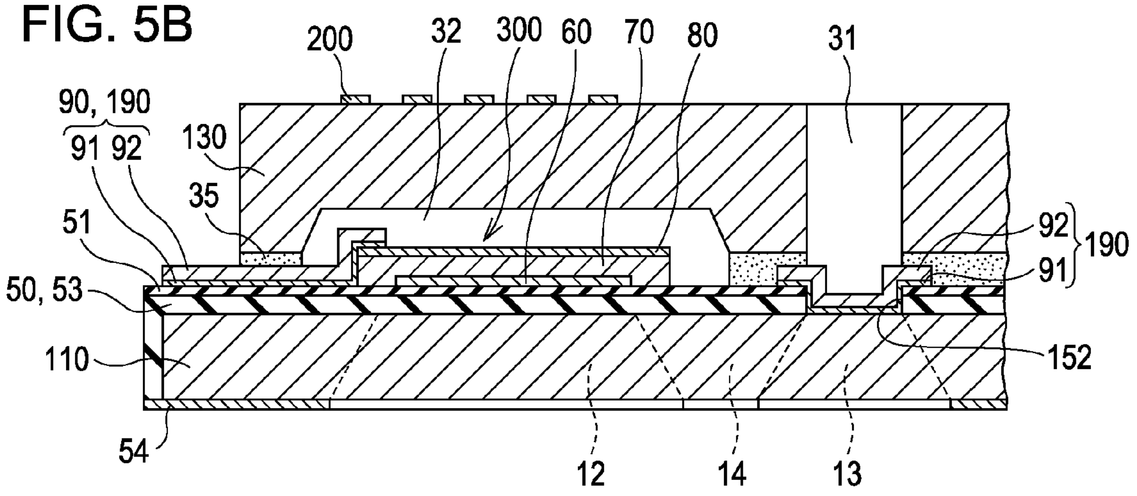
Figure 5C:
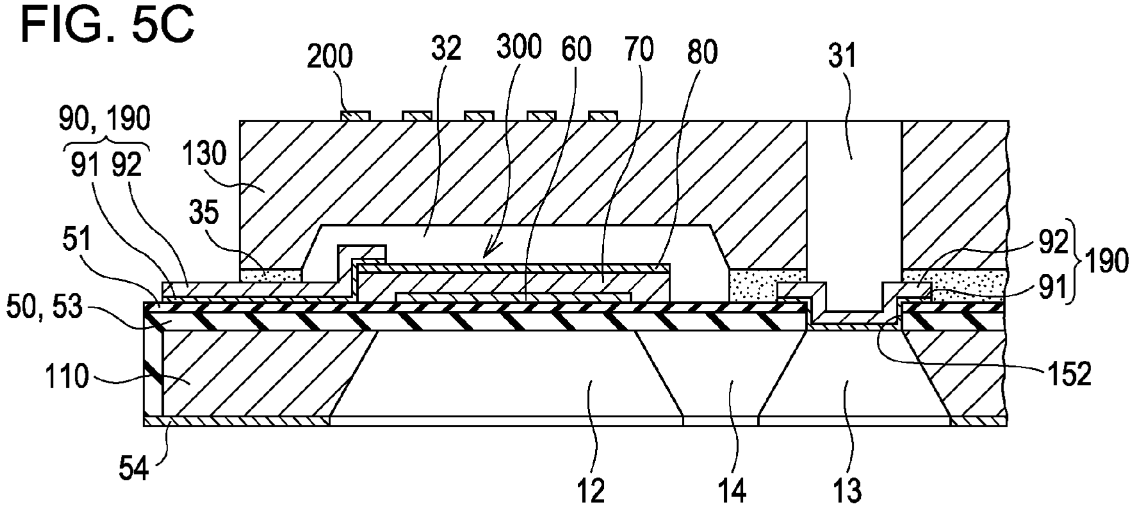

Then, as shown in FIG. 5A, the flow path forming substrate wafer 110 is polished to a certain thickness, and then is wet-etched with fluoronitric acid, for example, by spin etching, so that the flow path forming substrate wafer 110 has a predetermined thickness. Then, as shown in FIG. 5B, a mask film 54 is newly formed on the flow path forming substrate wafer 110 and is patterned into a predetermined shape. Then, as shown in FIG. 5C, the flow path forming substrate wafer 110 is subjected to anisotropic etching (wet etching) via the mask film 54 to form the liquid flow paths of at least the pressure generating chambers 12 in the flow path forming substrate wafer 110. In this example, the liquid flow paths of the pressure generating chambers 12, the communicating portion 13, and the ink supply paths 14 are formed. Specifically, the flow path forming substrate wafer 110 is etched with an etching solution, such as an aqueous solution of potassium hydroxide (KOH) until the elastic film 50 and the adhesion layer 91 (metal layer 92) are exposed. By this procedure, the pressure generating chambers 12, the communicating portion 13 and the ink supply paths 14 are formed simultaneously.

At this time, the etching solution does not flow into the reservoir forming plate wafer 130 via the exposed portion 152, since the exposed portion 152 is sealed with the wiring layer 190 consisting of the adhesion layer 91 and the metal layer 92. Thus, the etching solution does not stick to the connection wiring 200 which is provided on the surface of the reservoir forming plate wafer 130, and defects such as a break in wiring can be prevented. Moreover, there is no possibility that the reservoir forming plate wafer 130 will be etched because of entry of the etching solution into the reservoir portion 31.

In forming the pressure generating chambers 12 or the like, the surface of the reservoir forming plate wafer 130 opposite to the flow path forming substrate wafer 110 may be further sealed with a material having alkali resistance, for example, a sealing film comprising PPS (polyphenylene sulfide) PPTA (poly-paraphenylene terephthalamide), PET (polyethylene terephthalate), and the like. By so doing, defects, such as a break in the wiring provided on the reservoir forming plate wafer 130, can be prevented more reliably.

Figure 6A:
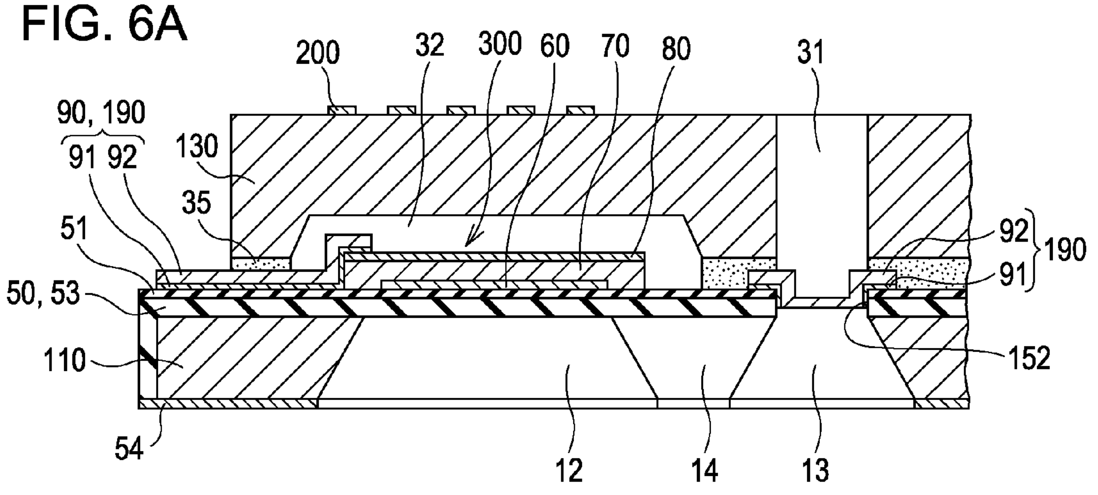
FIGS. 6A to 6C are sectional views showing the steps in the manufacturing process for the recording head according to Embodiments of the invention.

Then, as shown in FIG. 6A, a part of the wiring layer 190 within the exposed portion 152 is removed by wet etching (light etching) performed on the side of the communicating portion 13. That is, the adhesion layer 91 exposed to the communicating portion 13 and part of the metal layer 92, where the adhesion layer 91 has been diffused are removed by the light etching. By this operation, adhesion between the protective film 15, which is to be formed on the wiring layer 190 by a subsequent step, and the wiring layer 190 is weakened, thereby making it easier for the protective film 15 to be peeled from the wiring layer 190.

Figure 6B:
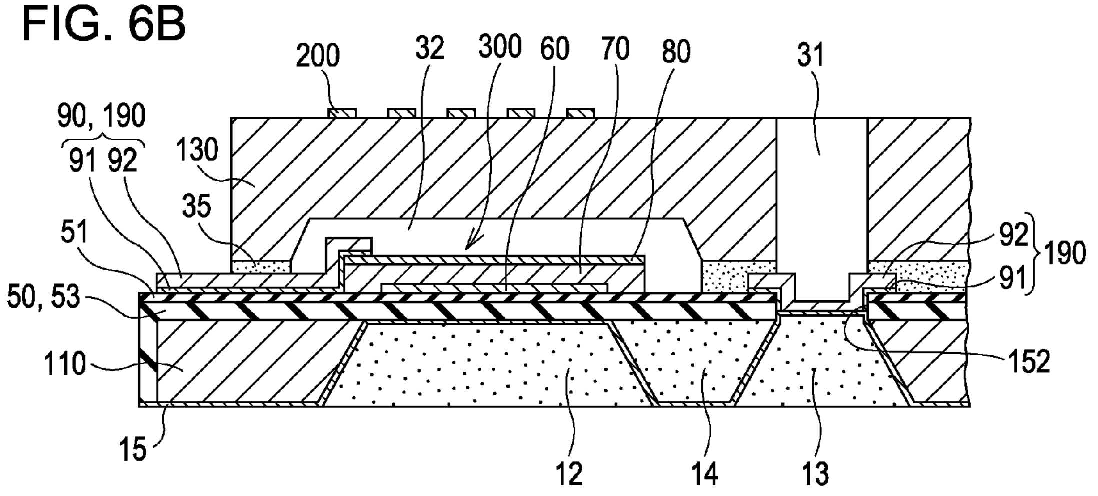

Then, the mask film 54 on the surface of the flow path forming substrate wafer 110 is removed and, as shown in FIG. 6B, a material having liquid resistance (ink resistance), for example, the protective film 15 comprising tantalum pentoxide, is formed, for example, by the CVD process. At this time, the exposed portion 152 is sealed with the metal layer 92, so that the protective film 15 is not formed, for example, on the outer surface of the reservoir forming plate wafer 130 via the exposed portion 152. Accordingly, the protective film 15 is not formed, for example, on the connection wiring 200 provided on the surface of the reservoir forming plate wafer 130. Consequently, defects, such as wrong connection of the drive IC 210 or the like, can be prevented, and the step of removing a surplus protective film 15 becomes unnecessary, thereby simplifying the manufacturing process and reducing the manufacturing cost.

Figure 6C:
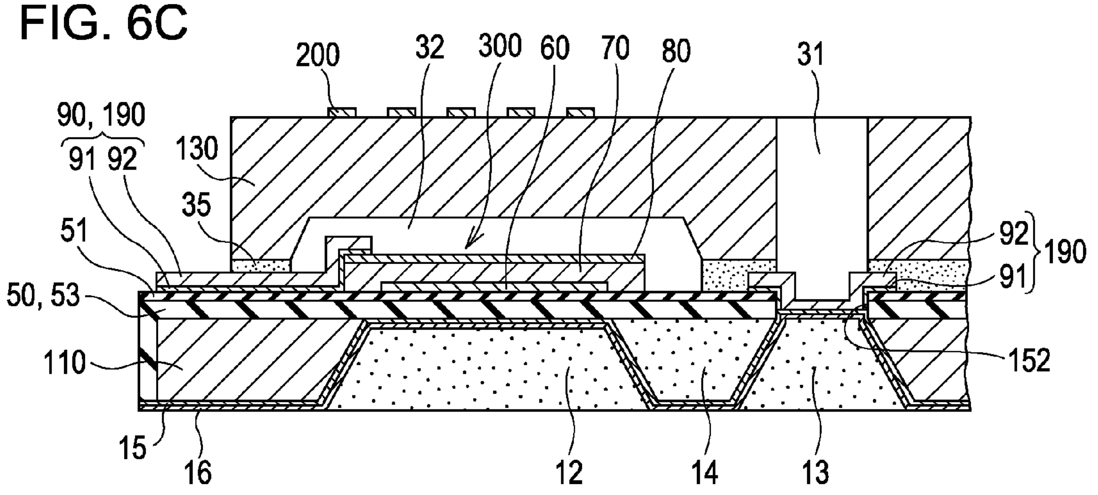

Then, as shown in FIG. 6C, a release layer 16 comprising a high stress material is formed on the protective film 15, for example, by the CVD process. The release layer 16 is formed of an oxide or a nitride, and its stress peels the protective film 15 on the wiring layer 92 from the metal layer 92. For this purpose, the release layer 16 has internal stress which is preferably compressive stress. The release layer 16 preferably uses a material whose adhesion to the protective film 15 is greater than the adhesion between the protective film 15 and the metal layer 92. Since the release layer 16 comprising the high stress material and having high adhesion to the protective film 15 is thus formed on the protective film 15, the protective film 15 formed on the metal layer 92 begins to peel off under the stress of the release layer 16.

By the above-described preparation step, a substrate array shown in FIG. 6C is prepared which is provided with the reservoir forming plate wafer 130 as a first substrate having formed therein the reservoir portion 31 as a first flow path, the flow path forming substrate wafer 110 as a second substrate boned to one surface side of the reservoir forming plate wafer 130 and having formed therein the communicating portion 13 as a second flow path, and the metal layer 92 as a separation layer partitioning the reservoir portion 31 and the communicating portion 13.

Next, a sealing step of sealing the reservoir portion 31 will be described.

Figure 7A:
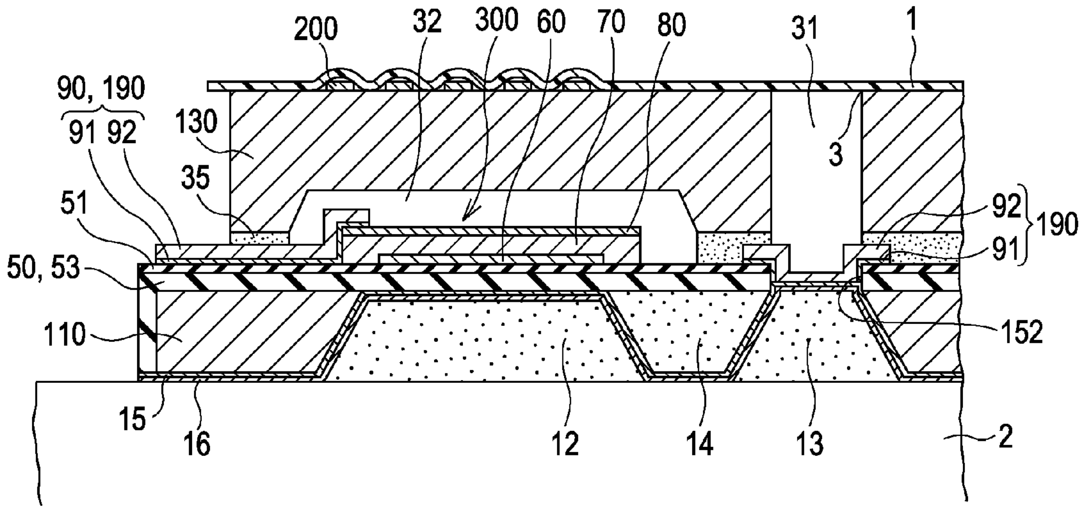
FIGS. 7A and 7B are sectional views showing the steps in the manufacturing process for the recording head according to Embodiments of the invention.

Before the sealing step is performed, a heating step of heating the substrate array to a predetermined temperature or higher is performed. In the heating step, as shown in FIG. 7A, the substrate array is placed on a platen 2 that is heated. The platen 2 has a flat surface on a side thereof being in contact with the flow path forming substrate wafer 110 and is set to a predetermined temperature. In the present embodiment, the temperature of the platen 2 is set to 60° C. which is higher than a temperature of a first etching solution used in a later-described first wet-etching step and higher than a temperature of a second etching solution used in a later-described second wet-etching step. By doing so, the substrate array is heated by the platen 2, so that the internal temperature of the reservoir portion 31 rises. Since the setting temperature is higher than the temperature of the first etching solution and the temperature of the second etching solution, the internal temperature of the reservoir portion 31 will become higher than the temperature of the first etching solution and the temperature of the second etching solution after a lapse of a sufficient period of time.

Next, as shown in FIG. 7A, in the sealing step, in a state in which the reservoir forming plate wafer 130 and the flow path forming substrate wafer 110 connected to each other are placed thereon, a film 1 is adhered to the platen 2 via an adhesive layer, thereby sealing a side of the reservoir portion 31 close to the connection wiring 200. The film 1 is adhered to a surface of the reservoir forming plate wafer 130 close to the connection wiring 200 so as to cover the connection wiring 200.

The film 1 is formed of a material having resistance to an etching solution, such as PE (polyester), PPS (polyphenylene sulfide), PPTA (poly-paraphenylene terephthalamide) or PET (polyethylene terephthalate). Moreover, the adhesive layer is preferably one that does not scratch on the substrate array and comes off without sticking on the substrate array when peeling off the film. As the film 1 and the adhesive layer, one having an adhesive layer laminated on a film is preferred, and an example thereof is the ICROS tape (registered trademark). The film may be adhered after the adhesive layer is formed on the reservoir forming plate wafer 130.

Figure 7B:
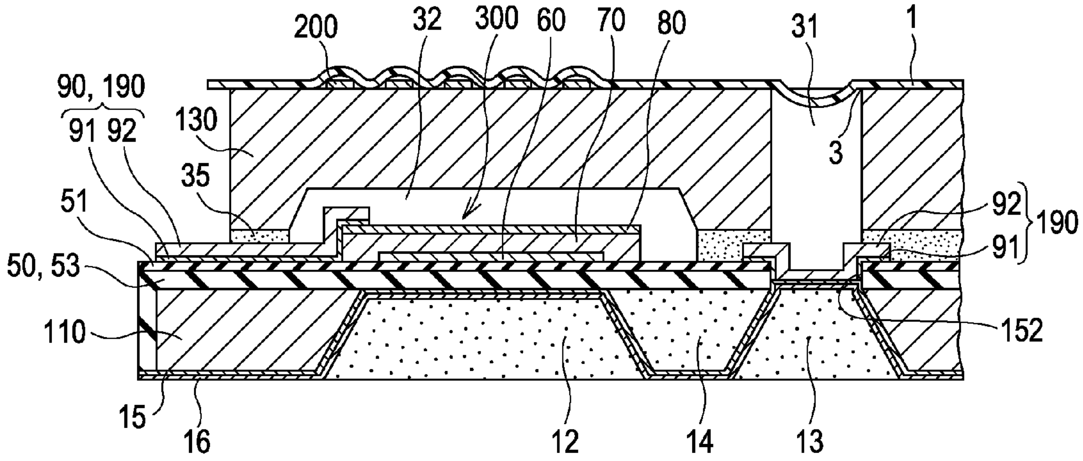

Next, a temperature lowering step is performed. Specifically, by placing the reservoir forming plate wafer 130 and the flow path forming substrate wafer 110 connected to each other at a position distant from the platen 2, the temperature of the reservoir forming plate wafer 130 and the flow path forming substrate wafer 110 is lowered. As a result, the internal temperature of the reservoir portion 31 is also lowered, so that a volume of air confined in the reservoir portion 31 decreases. By doing so, as shown in FIG. 7B, the film 1 is drawn into the reservoir portion 31 and thus has a shape curved to the wiring layer 190.

At this time, in the opening portion of the reservoir portion 31, by the adhesive force or elastic force of the film 1, the sum of an upward pressing force in the drawing and the internal pressure of the reservoir portion 31 become identical to the atmospheric pressure which is the external pressure of the reservoir portion 31. Therefore, the internal pressure of the reservoir portion 31 becomes smaller than the atmospheric pressure which is the external pressure of the reservoir portion 31. In this way, a force is generated in the film 1 causing the film 1 to be drawn into the reservoir portion 31. Therefore, the film 1 is tightly contacted with an edge portion 3 of the reservoir forming plate wafer 130, which is the opening portion of the reservoir portion 31.

Next, a removal step will be described.

Figure 8A:
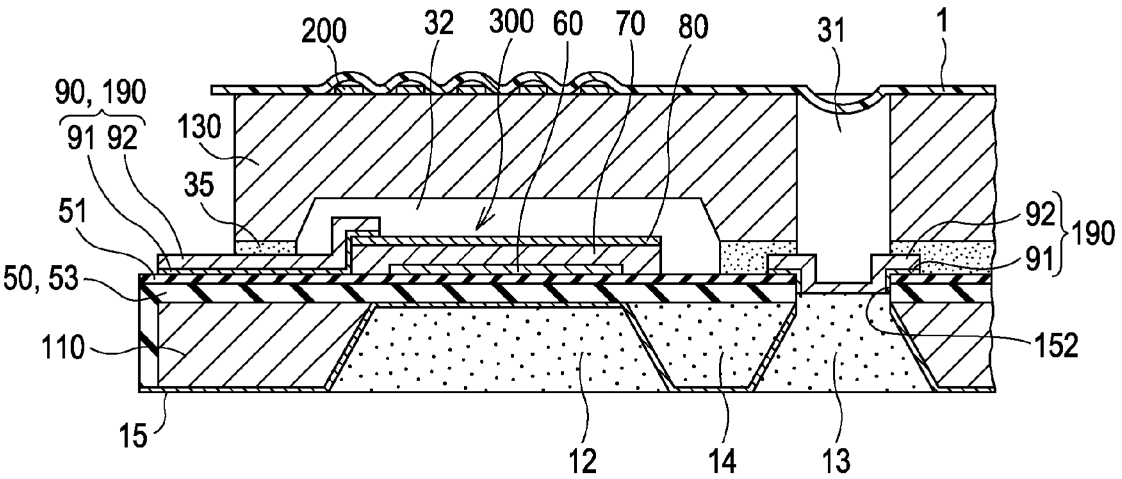
FIGS. 8A and 8B are sectional views showing the steps in the manufacturing process for the recording head according to Embodiments of the invention.

In the removal step, the metal layer 92 is removed by a first wet-etching step and a second wet-etching step. In the first wet-etching step, the release layer 16 is removed by wet etching using a first etching solution, whereby the protective film 15 on the metal layer 92 is completely removed together with the release layer 16, as shown in FIG. 8A. In the present embodiment, part of the wiring layer 190, on the side of the communicating portion 13, provided in the exposed portion 152, namely, the adhesion layer 91 and the metal layer 92 where the adhesion layer 91 has been diffused, has been removed by the afore-mentioned step. Thus, the adhesion between the wiring layer 190 and the protective film 15 is so weak that the protective film 15 can be easily peeled from the metal layer 92.

Figure 8B:
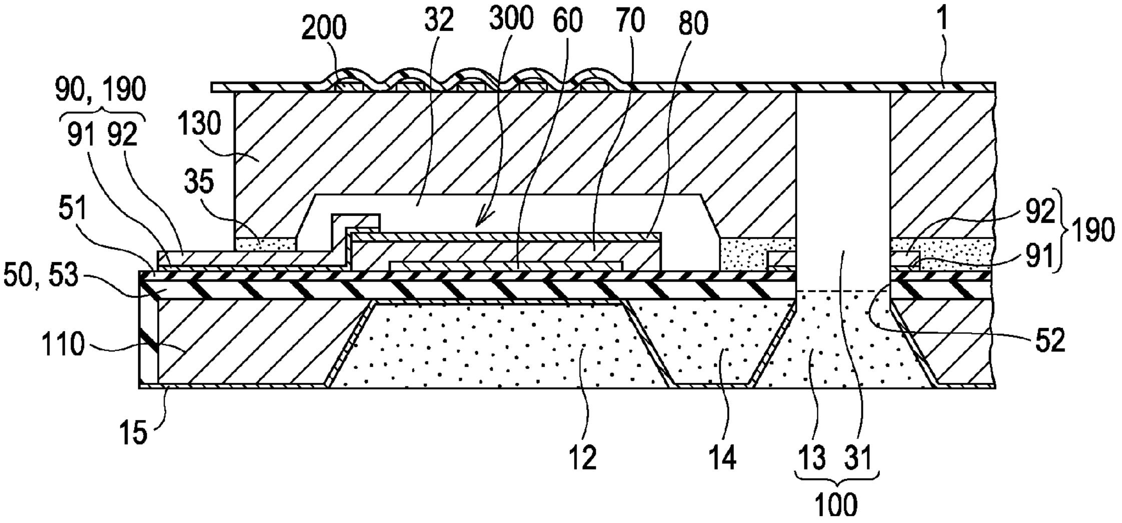

Then, as shown in FIG. 8B, in the second wet-etching step, the metal layer 92 is removed by wet etching using a second etching solution, performed on the side of the communicating portion 13 to form the through-hole 52. At this time, the protective film 15 is not present on the metal layer 92, so that the protective film 15 does not impede the wet etching of the metal layer 92, and the through-hole 52 can be formed easily by the wet etching. By the through-hole 52, the reservoir portion 31 and the communicating portion 13 are communicated with each other.

At this time, since the metal layer 92 is removed and the inside of the reservoir portion 31 is set to the atmospheric pressure, the shape of the film 1 drawn into the communicating portion 13 is changed from the downwardly curved shape in the drawing to a sectional shape close to a straight line by the elastic force of the film 1 as shown in FIG. 8B.

After the removal step, the substrate array is taken out of a liquid tank containing the second etching solution, and the film 1 and the adhesive layer are removed from the reservoir forming plate wafer 130. Moreover, at this time, the adhesive layer may be expanded or malformed by heating or the like so that it is easily removed.

If the reservoir 100 is formed by the above-described method, the protective film 15 is not formed on the surface of the wiring layer 190 which is exposed to the inside of the reservoir 100. Thus, although the wiring layer 190 may be likely to be eroded by ink, the amount of erosion is very small and poses no problem to the life of the head. Besides, a silicon dioxide film has been formed on the inner surface of the reservoir portion 31 by thermal oxidation of the reservoir forming plate wafer 130, although this silicon dioxide film is not shown. Thus, there is no need to provide the protective film 15 there.

After the reservoir 100 is formed, the drive IC 210 is mounted on the connection wiring 200 formed on the reservoir forming plate wafer 130, and the drive IC 210 and the lead electrodes 90 are connected by the drive wirings 220 (see FIGS. 2A and 2B). Then, unnecessary regions of the outer peripheral edge portions of the flow path forming substrate wafer 110 and the reservoir forming plate wafer 130 are removed, for example, by cutting by means of dicing. Then, the nozzle plate 20 having the nozzle openings 21 bored therein is bonded to the surface of the flow path forming substrate wafer 110 opposite to the reservoir forming plate wafer 130, and the compliance plate 40 is bonded to the reservoir forming plate wafer 130. The flow path forming substrate wafer 110 including the other members is divided into the flow path forming substrate 10 or the like of one-chip size as shown in FIG. 1 to produce the ink jet recording head having the above-described structure.

As described above, the manufacturing method of the liquid jet head described in the present embodiment includes: the preparation step of preparing the substrate array which is provided with the reservoir forming plate wafer 130 as a first substrate having formed therein the reservoir portion 31 as a first flow path, the flow path forming substrate wafer 110 as a second substrate boned to one surface side of the reservoir forming plate wafer 130 and having formed therein the communicating portion 13 as a second flow path, and the metal layer 92 as a separation layer partitioning the reservoir portion 31 and the communicating portion 13; the sealing step of sealing the reservoir portion 31 with the film 1 as a sealing film having the adhesive layer on a side thereof opposite to the reservoir forming plate wafer 130 and the flow path forming substrate wafer 110; and the removal step of removing the metal layer 92 after the sealing step is performed, the removal step being performed in a state in which the internal pressure of the reservoir portion 31 is lower than the external pressure.

According to such a configuration, the removal step is performed in a state in which the internal pressure of the reservoir portion 31 is lower than the external pressure. Therefore, since in the removal step, a force is generated in the film 1 causing the film 1 to be drawn into the reservoir portion 31, the adhesion of the film 1 sealing the reservoir portion 31 is improved. For this reason, the etching solution for removing the metal layer 92 in the removal step is prevented from leaking from the reservoir portion 31, whereby the connection wiring formed in the reservoir forming plate wafer 130 is prevented from being damaged by the etching solution and thus leading to a break or the like.

Moreover, the heating step of heating the substrate array to the predetermined temperature or higher is performed between the preparation step and the sealing step, and the removal step is performed under the predetermined temperature or lower.

According to such a configuration, the temperature within the reservoir portion 31 which is hermetically sealed by the film 1 is lowered from the temperature in the sealing step to the temperature in the removal step. Therefore, in the removal step, the internal pressure of the reservoir portion 31 becomes lower than the external pressure. Accordingly, since in the removal step, a force is generated in the film 1 causing the film 1 to be drawn into the reservoir portion 31, the adhesion of the film 1 sealing the reservoir portion 31 is improved.

Embodiment 2

In Embodiment 2, a case where the sealing step includes a temperature lowering step of lowering the temperature of the substrate array from the predetermined temperature will be described. In the preparation step, as described in Embodiment 1, a substrate array shown in FIG. 6C is prepared which is provided with the reservoir forming plate wafer 130 as a first substrate having formed therein the reservoir portion 31 as a first flow path, the flow path forming substrate wafer 110 as a second substrate boned to one surface side of the reservoir forming plate wafer 130 and having formed therein the communicating portion 13 as a second flow path, and the metal layer 92 as a separation layer partitioning the reservoir portion 31 and the communicating portion 13.

In the sealing step, as described in Embodiment 1 using FIG. 7A, a side of the reservoir portion 31 close to the connection wiring 200 is sealed by the film 1. In the temperature lowering step, the substrate array is separated from the platen 2 and is left in a cooling tank for a predetermined period of time in a state in which the side of the reservoir portion 31 close to the connection wiring 200 is sealed by the film 1.

After the substrate array is cooled to a room temperature, the first wet-etching step of removing the release layer 16 and the protective film 15 formed on the metal layer 92, described in Embodiment 1 using FIG. 8A is performed, and the second wet-etching step of removing the metal layer 92, described using FIG. 8B is performed.

Then, the substrate array is taken out of the liquid tank containing the second etching solution, and the film 1 is peeled off from the reservoir forming plate wafer 130.

As described above, in Embodiment 2, the sealing step of sealing the reservoir portion 31 by the film 1 includes the temperature lowering step of separating the substrate array from the platen 2 and leaving the substrate array in the cooling tank, thereby lowering the temperature of the substrate array from the predetermined temperature.

According to such a configuration, the temperature within the reservoir portion 31 which is hermetically sealed by the film 1 shows a large difference between the temperature in the sealing step and the temperature in the removal step. Therefore, since at a time point before the removal step is performed, the force causing the film 1 to be drawn into the reservoir portion 31 is further increased, the adhesion of the sealing film sealing the reservoir portion 31 is further improved.

In this embodiment, although the temperature is lowered to the room temperature in the temperature lowering step, the temperature may not be lowered to the room temperature.

Embodiment 3

Although Embodiments 1 and 2 have been described for a case where the sealing step includes the heating step, Embodiment 3 will be described for a case where the sealing step is performed in a reduced-pressure environment compared with the removal step.

In the preparation step, as described in Embodiment 1, a substrate array shown in FIG. 6C is prepared which is provided with the reservoir forming plate wafer 130 as a first substrate having formed therein the reservoir portion 31 as a first flow path, the flow path forming substrate wafer 110 as a second substrate boned to one surface side of the reservoir forming plate wafer 130 and having formed therein the communicating portion 13 as a second flow path, and the metal layer 92 as a separation layer partitioning the reservoir portion 31 and the communicating portion 13.

Figure 9:
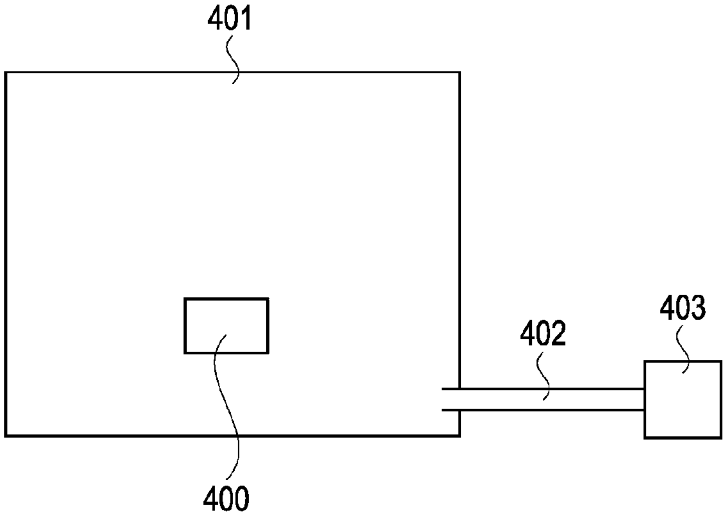
FIG. 9 is a schematic view for explaining reduced-pressure environment in Embodiment 3 of the invention.

FIG. 9 is a schematic view for explaining the reduced-pressure environment in Embodiment 3. A reduced-pressure chamber 401 is connected to a vacuum pump 403, such as a rotary pump, via a pipe 402.

In the sealing step, as shown in FIG. 9, the substrate array 400 prepared in the preparation step is placed inside the reduced-pressure chamber 401. Next, the vacuum pump 403 is operated so that the inside of the reduced-pressure chamber 401 is set to a reduced-pressure environment lower than the atmospheric pressure.

Figure 10:
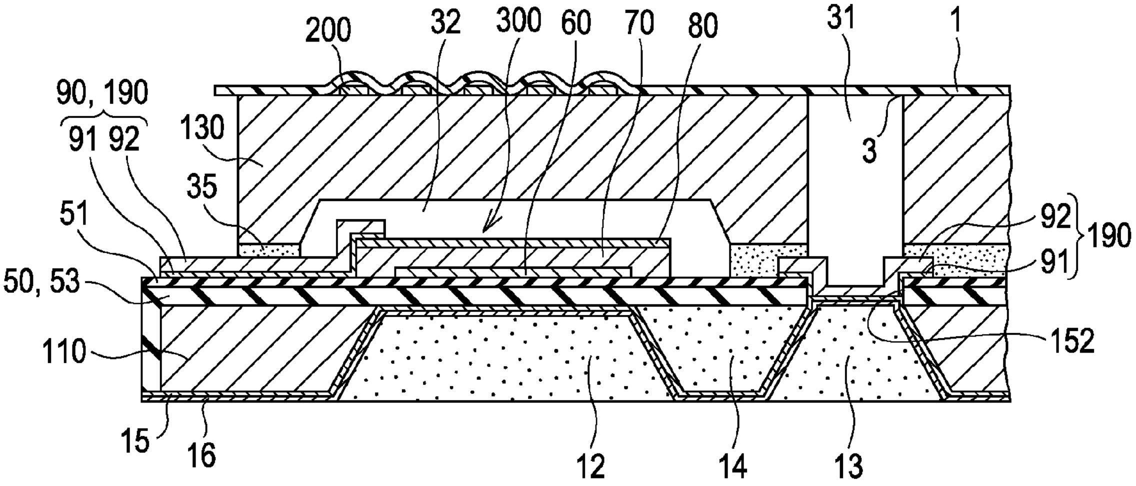
FIG. 10 is a sectional view of a substrate array in a state of having a film as a sealing film bonded thereon.

FIG. 10 is a sectional view of the substrate array prepared in the preparation step in a state of having the film 1 as the sealing film bonded to the reservoir forming plate wafer 130. FIG. 10 corresponds to FIG. 7A described in Embodiment 1 in which the platen 2 is removed. Next, in the sealing step, as shown in FIG. 10, the side of the reservoir portion 31 close to the connection wiring 200 is sealed in the reduced-pressure chamber 401 being under the reduced-pressure environment by the film 1 having the adhesive layer. The film 1 is adhered onto the surface of the reservoir forming plate wafer 130 close to the connection wiring 200 so as to cover the connection wiring 200.

Next, in the sealing step, the inside of the reduced-pressure chamber 401 is returned to the atmospheric pressure, and the substrate array 400 is taken out of the reduced-pressure chamber 401. At this time, the internal pressure of the reservoir portion 31 sealed by the film 1 is lower than the external pressure. Therefore, as shown in FIG. 7B described in Embodiment 1, the film 1 has a shape curved downward in the drawing so that the film 1 is drawn into the reservoir portion 31.

In the removal step, as described above in Embodiment 1, the metal layer 92 is removed by the first wet-etching step and the second wet-etching step. Then, the substrate array is taken out of a liquid tank containing the second etching solution, and the film 1 is removed from the reservoir forming plate wafer 130. It is to be noted that the above-described steps may be performed under other pressure environments. For example, the sealing step may be performed under the atmospheric pressure environment, and the removal step may be performed under a high-pressure environment.

As described above, in the method of manufacturing the liquid jet head described in the present embodiment, the sealing step is performed under a low-pressure environment lower than that of the removal step.

According to such a configuration, the removal step can be performed in a state in which the internal pressure of the reservoir portion 31 as the first flow path which is hermetically sealed by the film 1 as the sealing film is lower than the external pressure. Therefore, since in the removal step, a force is generated in the film 1 causing the film 1 to be drawn into the reservoir portion 31, the adhesion of the film 1 sealing the reservoir portion 31 is improved.

Modification

In the above-described embodiments, the communicating portion 13 is provided as the liquid flow path which is present on the flow path forming substrate wafer 110. However, the communicating portion 13 may not be provided, and the invention can be applied to a case where liquid flows from the reservoir portion 31 of the reservoir forming plate wafer 130 directly into other liquid flow paths other than the communicating portion 13 of the flow path forming substrate wafer 110.

Furthermore, in the above-described embodiments, the ink jet recording head is taken for illustration as an example of the liquid jet head. However, the invention is aimed to broadly cover the overall liquid jet head and, needless to say, can be applied to methods for producing liquid jet heads for ejecting liquid other than ink. Examples of other liquid jet heads include a variety of types of recording heads for use in an image recording apparatus such as a printer, a coloring-material jet head for use in manufacture of a color filter of a liquid crystal display or the like, an electrode-material jet head for use in forming an electrode of an organic EL display, a FED (field emission display) or the like, a bioorganic-material jet head for use in manufacture of a biochip, and the like. The entire disclosure of Japanese Patent Application No. 2008-067212, filed Mar. 17, 2008 is incorporated by reference herein.

The entire disclosure of Japanese Patent Application No. 2009-021216, filed Feb. 2, 2009 is incorporated by reference herein.

What is claimed is:

1. A method for manufacturing a liquid jet head, comprising:

a preparation step of preparing a substrate array which is provided with a first substrate having formed therein a first flow path, a second substrate bonded to one side of the first substrate and having formed therein a second flow path, and a separation layer partitioning the first flow path and the second flow path;

a sealing step of sealing the first flow path by adhering a sealing film onto a side of the first substrate opposite to the second substrate using an adhesive layer; and a removal step of removing the separation layer after the sealing step is performed, in the removal step, the separation layer is removed in a state in which an internal pressure of the first flow path is lower than an external pressure.

2. The method for manufacturing the liquid jet head according to claim 1, further comprising a heating step of heating the substrate array to a predetermined temperature or higher before the sealing step is performed, in the removal step, the separation layer is removed at the predetermined temperature or lower.

3. The method for manufacturing the liquid jet head according to claim 2, further comprising a temperature lowering step of lowering the temperature of the substrate array from the predetermined temperature after the sealing step is performed.

4. The method for manufacturing the liquid jet head according to claim 3, wherein in the temperature lowering step, the substrate array is left under a room temperature.

5. The method for manufacturing the liquid jet head according to claim 1, in the sealing step, the first flow path is sealed under a first pressure environment, and in the removal step, the separation layer is removed under a second pressure environment higher than the first pressure environment.

* * * * *